May 27, 1947. V. F. ZAHODIAKIN 2,421,175

PISTON RING

Filed March 22, 1946

INVENTOR.
Victor F. Zahodiakin
BY
Wood, Arey, Herron & Evans
Attorneys

Patented May 27, 1947

2,421,175

UNITED STATES PATENT OFFICE 2,421,175

PISTON RING

Victor F. Zahodiakin, Short Hills, N. J.

Application March 22, 1946, Serial No. 656,384

5 Claims. (Cl. 309—45)

This invention relates to piston rings. It is particularly directed to the oil control type of ring. The broad basic purpose of the inventor in this case has been to provide a novel and improved ring which provides circumferential pressure against a cylinder bore at all points so that the ring will have uniform engagement with the wall of the bore and will conform readily to any local or general variation in the contour of the wall.

It has been the further object of the present inventor to provide a ring of this character which provides maximum clearance for circulation of oil from the ring; that is, a ring from which the oil is readily displaced and returned to the crankcase from the region of the ring but in which the ring design will not permit the passage of oil into the combustion chamber. This ring is of great value in that it prevents carbon formation such as occurs rapidly in high speed engines, particularly in engines which operate under high compression and utilize low grade fuel oil such as Diesel engines. It has been the purpose to provide a ring in which the oil clearance openings in the back wall constitute at least 75% of the total area of the back wall.

It is a still further object of the present inventor to provide a piston ring including an annular channel, that is to say, a ring which is of U-shape in vertical radial cross section and the crowns of which are firmly supported by struts formed integrally with the crowns whereby the crowns will not collapse when the ring is subjected to high velocity. In conjunction with this objective, the inventor has provided that the struts will straddle or be disposed across the radial openings between the segments of the sectional ring, and thus at the weakest points of the ring. In constructing the ring the struts may be located at different distances from the cylinder bore contacting edges of the crowns depending upon the type of engine to which they are applied. In high speed engines they are disposed closer to the cylinder wall contacting edges of the ring thereby providing a maximum amount of support.

The necessity for this support is apparent in that the bore contacting walls of the crown sections have a certain amount of frictional engagement with the bore and there will be a tendency to bend or deform the crowns thus destroying the effectiveness of the ring. It is impractical to accomplish better support by using heavier crown links, that is the U-shaped arms joining the upper and lower crowns of each segment, because this increase in thickness would destroy the flexibility of the ring as well as increase its weight.

A further advantage of this type of ring, wherein the crowns or cylinder wall engaging segments of the ring are supported by perpendicular and intermediate struts, is that the crowns are supported adequately during manufacturing processes particularly in the matter of heat treating. This type of ring is preferably made of high carbon steel. It is heated to a high temperature, for example 1475° Fahrenheit, before it is quenched in water or oil. While at this temperature the rings are under pressure being axially superimposed one upon the other under pressure. The rings will collapse under pressure at this heat unless adequate intermediate bracing between the upper and lower crowns is provided.

Other objects and certain advantages of the invention will be more fully apparent from a description of the drawings in which.

Figure 1:
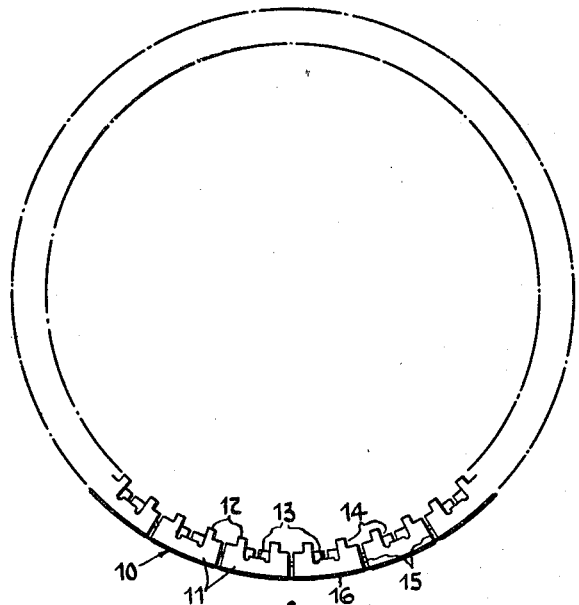
Figure 1 is a top plan view of the improved ring, a portion of the ring being shown in full lines and the rest merely in outline.
Figure 4:
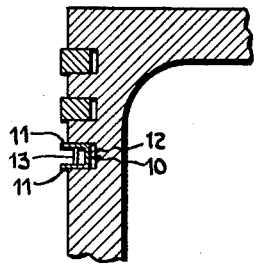
Figure 4 is a fragmentary sectional view of a portion of a piston showing the ring in position therein.
Figure 2:
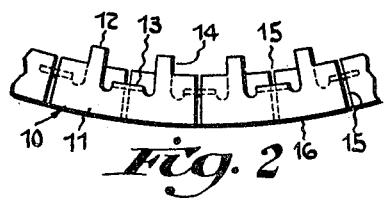
Figure 2 is an enlarged fragmentary top plan view.

Referring to the drawings, a strip of steel from which the ring is constructed is generally indicated at 10. The ring is stamped or punched to provide integral flexibly joined sections or segments. The essential members of the ring are the crown portions 11, the U-shaped connecting link portions 12 and the struts 13.

Figure 7:
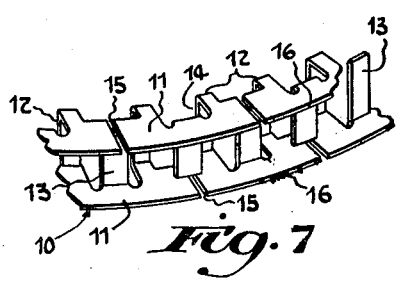
Figure 7 is an enlarged perspective view of a portion of the finished ring.

The width of the openings 14 between the connecting links 12 is approximately three and one-half times that of the width of the links 12. The length of these openings laterally of the strip is such as to provide crown portions 10 which are relatively wide radially. At alternately opposite ends of these openings 14, sufficient material is left to form the struts 13. The lateral length of these struts as initially stamped out is such as to provide for support and spacing of the crown portions 10 when they are bent to the parallel relationship of Figure 7 at which time the struts have been bent to perpendicular position relative to the crowns.

Figure 6:
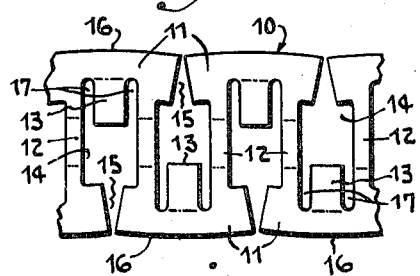
Figure 6 is an enlarged plan view of a portion of a strip forming the ring showing the ring after it has been stamped or punched to provide the necessary formation.

The slots 15 between the crown portions as initially formed taper outwardly; that is to say, the edges of the crown segments are not parallel. As the ring is bent to circular position (see finished views) these ends are brought into parallelism and proper spacing. Also, the outer edges 16 of the segments as initially formed (Figure 6) are curved or arcuate the line of their curvature corresponding to the normal peripheral curve or circular outline of the ring for which the blank has been formed.

Figure 3:
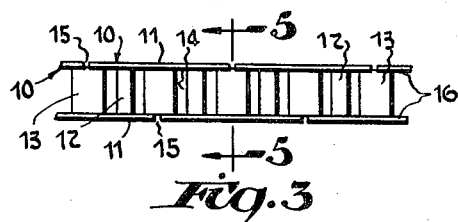
Figure 3 is a side view of the ring as shown in Figure 2.
Figure 5:
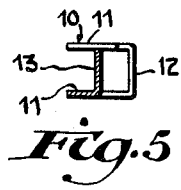
Figure 5 is a sectional view taken on line 5—5 Figure 2.

As stated, the struts are of ample width so as to adequately span the slots 15 and to support the adjacent crown portions adequately as the ring tends to wear and the slots widen. The struts are connected to the crown portions a sufficient distance inwardly from the crown portions so as to be disposed within the slot of the piston when installed (Figure 3). The spacing of these struts with respect to the outer peripheral edge of the ring may be varied, in high speed engines the struts are in position closer to the external edge of the ring and for slower speed engines they are back further. Their position is of importance in respect to adequate support of the crowns against collapse under pressure, during manufacture or due to friction during reciprocation.

It will be apparent from the drawing that the clearance slots 15 are staggered as between the upper and lower crowns so that the strut projecting from one crown will straddle the slot between the adjacent crown segments at the opposite side of the ring.

In order to produce the rings commercially, the smallest width of the radial slots between the segments in blank form should be not less than 75% in relation to the thickness of the material used to make the ring. Further, the struts should have a circumferential dimension considerably wider than the radial slots for as the ring tends to wear the radial slots will gradually increase in width and the crowns would in time lack support. It is preferable that the radial slots be positioned in staggered relationship as between the upper and lower crown sections.

The ring is constructed in such manner that when the struts are in completely folded position they are perpendicular to the upper and lower crowns of the ring segments and it is impossible for pressure to disturb the parallel relationship of the crowns. It is preferable that the width or circumferential dimension of the struts shall be not less than twice as much as the circumferential dimension or width of the U-shaped portions or links which join the crowns of the respective segments.

When the piston rings are installed in the piston, the outer periphery of the ring being in contact with the cylinder bore, the ring projects in the customary manner beyond the diameter of the piston. Therefore, the radial dimension of the crowns radially adjacent the struts is greater than the amount of the projection of the ring. When the blank is formed the connecting links 12 and the struts 13 provide opening 17 and the width of the opening should be not less than 75% in relation to the thickness of the material.

Having described my invention, I claim:

1. A piston ring comprising a strip of resilient sheet material folded in a rectangular body, said strip of material providing upper and lower crowns having circumferential edges for the scraping of oil, said crowns integrally connected by links, and struts adapted to retain, in rigid position, the crowns of the ring, one end of each strut being integrally connected with the crowns and the other end of each strut disposed in contact with adjacent crowns straddling the radial slot between the crowns.

2. A piston ring comprising, a strip of resilient sheet material folded in a rectangular body, said strip of material providing upper and lower crown sections having circumferential edges for the scraping of oil, said crown sections integrally connected by means of links and, crown supports, said crown supports adapted to retain the crown sections in rigid position and each section of the ring incorporating two crown links and an intermediate strut, the radial slots between adjacent sections being adjacent to the ends of the struts and straddled thereby.

3. A piston ring comprising, a strip of resilient sheet material folded in a rectangular body, said strip of material providing upper and lower crown sections having circumferential edges for the scraping of oil, said crown sections integrally connected by means of links and, crown supports, said crown supports adapted to retain the front portions of the crown sections in rigid position and each section of the ring incorporating two crown links and an intermediate strut, the radial slots between adjacent sections being adjacent to the ends of the struts and straddled thereby, said links adapted to support rear portions of crown sections.

4. A piston ring consisting of a strip of resilient sheet material providing parallel upper and lower crown sections separated by radial slots, U-shaped links connecting said crown sections, there being two links for each crown section, the links of each upper section being connected to the adjacent lower sections, the upper and lower sections being staggered, and struts formed integrally with alternate sections and disposed perpendicularly relative thereto, the free ends of said struts engaging the adjacent portions of the opposite sections and straddling the slot therebetween.

5. A piston ring fabricated from a strip of resilient sheet material disposed so as to form upper and lower circumferential rows of crown sections spaced by radial slots, U-shaped links connecting said crown sections and struts disposed perpendicularly between said crown sections for spacing and supporting the crown sections, said struts being formed integrally in each case with one crown section and having their free ends in engagement with opposite crown sections adjacent the radial slots supporting the sections and straddling the slots.

VICTOR F. ZAHODIAKIN.

REFERENCES CITED

The following references are of record in the file of this patent:

UNITED STATES PATENTS

| Number | Name | Date |
|---|---|---|
| 2,273,691 | Bowers | Feb. 17, 1942 |
| 2,310,311 | Phillips | Feb. 9, 1943 |
| 2,346,204 | Bowers | Apr. 11, 1944 |